(12) United States Patent
Yang et al.

(10) Patent No.: US 8,619,039 B2
(45) Date of Patent: *Dec. 31, 2013

(54) TRANSLUCENT TOUCH SCREEN DEVICES INCLUDING LOW RESISTIVE MESH

(75) Inventors: Jung Sik Yang, Gurnee, IL (US); Amit Kaistha, Skokie, IL (US); Chan Woo Park, Grayslake, IL (US); Matthew B. Wienke, Highland Park, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1129 days.

This patent is subject to a terminal disclaimer.

(21) Appl. No.: 11/962,505

(22) Filed: Dec. 21, 2007

(65) Prior Publication Data

US 2009/0160782 A1 Jun. 25, 2009

(51) Int. Cl.
*G06F 3/041* (2006.01)

(52) U.S. Cl.
USPC ........................ 345/173; 178/18.01

(58) Field of Classification Search
USPC ........................ 345/173; 178/18.01
See application file for complete search history.

(56) References Cited

U.S. PATENT DOCUMENTS

| | | | | |
|---|---|---|---|---|
| 4,893,115 | A * | 1/1990 | Blanchard | 345/174 |
| 6,453,045 | B1 | 9/2002 | Zurek et al. | |
| 6,622,174 | B1 * | 9/2003 | Ukita et al. | 709/246 |
| 6,636,203 | B1 * | 10/2003 | Wong et al. | 345/173 |
| 6,670,949 | B1 * | 12/2003 | Ahn et al. | 345/173 |
| 6,961,049 | B2 | 11/2005 | Mulligan et al. | |
| 7,199,788 | B2 * | 4/2007 | Ise et al. | 345/173 |
| 7,277,081 | B2 * | 10/2007 | Ukita et al. | 345/156 |
| 7,492,602 | B2 * | 2/2009 | Kim et al. | 361/752 |
| 2002/0039094 | A1 | 4/2002 | Yamada et al. | |
| 2004/0263481 | A1 * | 12/2004 | Nishikawa et al. | 345/173 |
| 2005/0043056 | A1 * | 2/2005 | Boesen | 455/550.1 |
| 2005/0083307 | A1 * | 4/2005 | Aufderheide et al. | 345/173 |
| 2005/0270273 | A1 | 12/2005 | Marten | |
| 2007/0236618 | A1 * | 10/2007 | Maag et al. | 349/12 |
| 2009/0146970 | A1 * | 6/2009 | Lowles et al. | 345/174 |

FOREIGN PATENT DOCUMENTS

| | | |
|---|---|---|
| CN | 2891038 Y | 4/2007 |
| JP | 2006-344163 A | 12/2006 |
| KR | 10-2007-0013630 A | 1/2007 |
| WO | 0235333 A1 | 5/2002 |

OTHER PUBLICATIONS

Motoming A1200, http://www.motorola.com/consumer/v/index, one page.
PCT/US2008/086905 Search Report; Jun. 26, 2009; 11 Pages.

(Continued)

*Primary Examiner* — Amare Mengistu
*Assistant Examiner* — Vinh Lam

(57) ABSTRACT

The disclosed translucent or semi-transparent touch screen device includes a mesh composed of a low resistive material and method for forming a touch screen and applying components to the touch screen according to a heat based process. The low resistivity of the mesh beneficially allows pattern traces a small width, and therefore allows more touch zones per specified area than previously available. The disclosed semi-transparent touch screen device may incorporated into a mobile communication device such as a clam shell form factor device with a flip is configured so that an adjacent main display screen is visible through the touch screen device. Input received by the touch screen device is responsive to indicia displayed on the display screen. Since the disclosed touch screen may include many touch zones, beneficially the functionality of the device in the closed position is improved over previous semi-transparent touch screens.

11 Claims, 4 Drawing Sheets

(56) References Cited

OTHER PUBLICATIONS

"Touch Screen and Touch window embody Nissha's extensive technology capability", Nissha Printing Co., Ltd. Touch Input, http://www.nissha.co.jp/english/product/touch/index.html, one page, Dec. 19, 2007.

Motoming A1200, http://www.motorola.com/consumer/v/index, one page, Dec. 19, 2007.

The State Intellectual Property Office of the People's Republic of China, "Notice of the First Office Action" form Chinese Patent Application No. 200880121833.6 dated Dec. 23, 2011, 5 pages.

European Patent Office, "Extended Search Report" for European Patent Application No. 08867894 dated Apr. 24, 2012, 8 pages.

* cited by examiner

TRANSLUCENT TOUCH SCREEN DEVICES INCLUDING LOW RESISTIVE MESH

CROSS REFERENCE TO RELATED APPLICATIONS

This application is related to co-pending U.S. patent application Ser. No. 11/962,466, "Translucent Touch Screen Devices Having Vertically Oriented Pattern Traces", filed Dec. 21, 2007, and to co-pending U.S. patent application Ser. No. 11/962,531, "Translucent Touch Screens Including Invisible Electronic Component Connections", filed Dec. 21, 2007, both of which are incorporated by reference herein in their entirety.

FIELD

Disclosed are devices for touch input and methods for forming devices for touch input, and more particularly, translucent touch screen devices for use with mobile communication devices and methods for forming translucent devices for touch input.

BACKGROUND

Mobile communication devices are a part of everyday life. Users may have more than one mobile communication device, and may trade in models yearly to own those with current design trends and up-to-date functionality. Manufacturers are constantly striving to include advanced features in their mobile communication devices as well as maintain a design edge. While there is a trend toward the inclusion of more features and improvements for current features, there is also a design trend toward smaller mobile communication devices. It would be desirable while providing advanced features and maintaining an edge in design trends, to also make improvements to reduce manufacturing costs.

A popular design trend is the translucent touch screen. In for example a clam shell form factor device, a substantially transparent touch screen may be included on the flip of the device. The main display on the main housing may be viewed through the touch screen of the flip so that a user may utilize menus of the main display without placing the clam shell device in the open position. For example, the translucent touch screen may include discreet buttons or touch zones which when touched are responsive to indicia on the main display.

Indium tin oxide (ITO) has been utilized for semi-transparent capacitive touch screens. In translucent ITO touch screens, patterns are formed to provide activation points or zones on the touch screen. Typically, opaque silver ink is used to form signal traces from the activation zones to a printed circuit board (PCB) or other circuitry component linked to the controller of the device. A set of touch zones is formed by a pattern of ITO areas, separated one from another to isolate the zones from one another. In a standard touch screen size of approximately 40 mm by approximately 60 mm, an ITO touch screen may include up to eight touch zones or buttons without using opaque silver ink signal traces. Electronic components are connected to the silver ink signal traces by adhesion. Moreover, the opacity of the silver ink can detract from the translucent look of the touch screen, and often the silver ink may therefore be concealed by artwork. While semi-transparent touch screens made using ITO are gaining popularity, improvements in semi-transparent touch screens are desirable.

DETAILED DESCRIPTION

Figure 1:
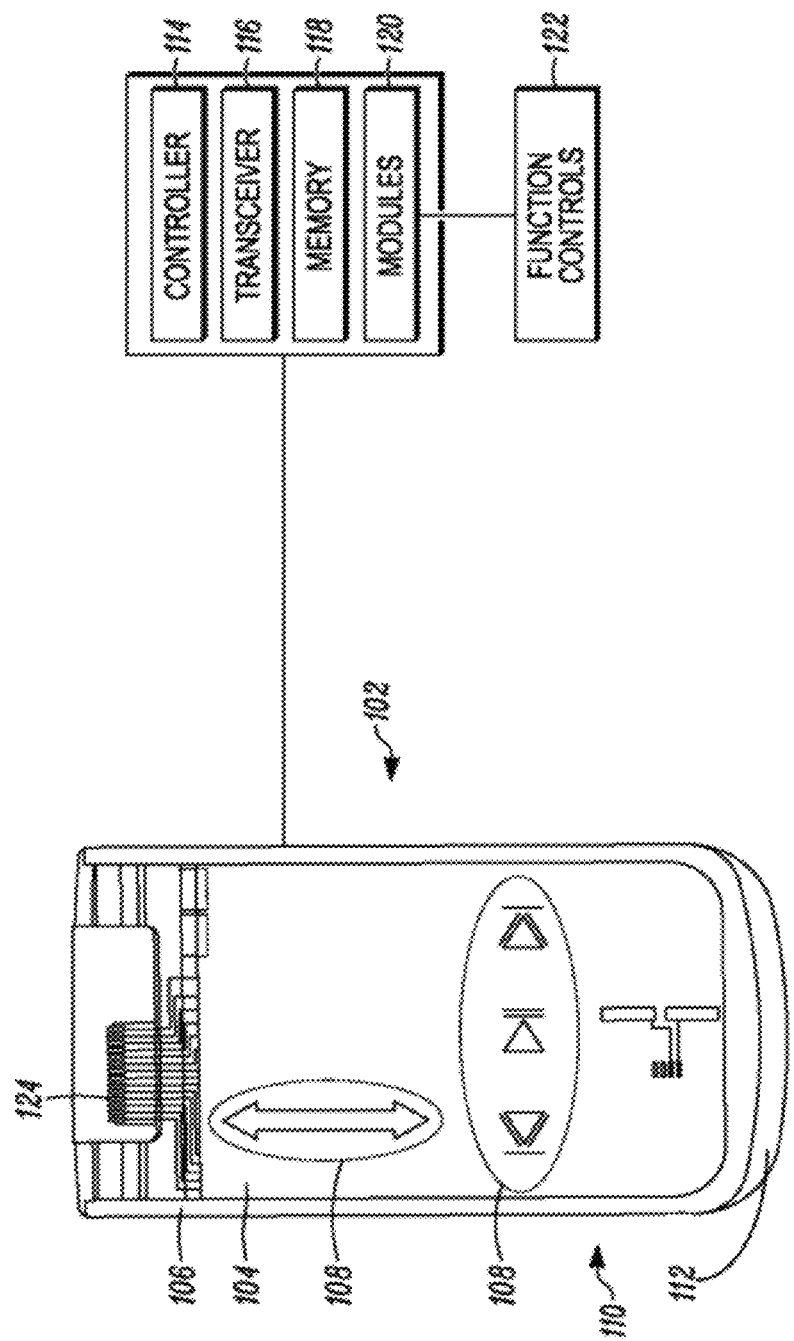
FIG. 1 depicts a mobile communication device having a clam shell form factor, where the disclosed semi-transparent or translucent touch screen device is incorporated into the flip and indicia on the main display of the main housing are visible through the disclosed touch screen.

It would be beneficial were a touch screen to include substantially more than eight touch zones or buttons in a standard touch screen size of approximately 40 mm by approximately 60 mm. Disclosed is a translucent touch screen device of a mesh composed of a low resistive material and a method for forming a touch screen and applying components to the touch screen according to a heat based process. More particularly, the disclosed touch screen includes a mesh composed of a low resistive material, such as copper, having pattern traces formed in the mesh, the pattern traces configured to receive input to generate touch signals. The low resistivity of the mesh beneficially allows pattern traces to be of a smaller width than that of the glass-like ITO, and therefore allows more touch zones per specified area than are possible with ITO.

The touch screen utilizing a low resistive material such as copper can be semi-transparent and used in the same way as an ITO touch screen. For example, the presently described touch screen may be used in a flip of a clam shell form factor mobile communication device having circuitry to receive touch signals to control at least one function of the mobile communication device incorporating the touch screen device. However, the low resistive material, beneficially, is capable of withstanding heat processing that the silver ink traces of a translucent touch screen utilizing ITO is not capable of withstanding. Therefore, the processes for forming the touch screen may beneficially include heat processes such as molding. Heat processes can include less processing than for example, forming a product by an adhesion process.

The disclosed semi-transparent touch screen device incorporated into a mobile communication such as a clam shell form factor flip is configured so that an adjacent main display screen is visible through the touch screen device. Input received by the touch screen device is responsive to indicia displayed on the display screen. Since the disclosed touch screen incorporating a mesh having a low resistivity value may include more touch zones than possible with an ITO touch screen without opaque silver ink signal traces, beneficially the functionality of the device in the closed position is improved over a device utilizing an ITO touch screen.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited.

Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

FIG. 1 depicts a mobile communication device 102 having a clam shell form factor, where the disclosed semi-transparent, or translucent touch screen device 104 is incorporated into the flip 106 and indicia 108 on the main display 110 of the main housing 112 is visible through the disclosed touch screen 104. While the disclosed touch screen is discussed with respect to utilization in a mobile communication device having a clam shell form factor flip housing, it is understood that the disclosed touch screen device may be used in conjunction with a slider form factor and a rotator form factor. It is further understood that the disclosed touch screen may be utilized in any suitable electronic device, and the present discussion is not intended to limit its many possible uses.

The mobile communication device 102 may be implemented as a cellular telephone (also called a mobile phone). The mobile communication device 102 represents a wide variety of devices that have been developed for use within various communication networks. Such handheld communication devices include, for example, cellular telephones, messaging devices, personal digital assistants (PDAs), notebook or laptop computers, mobile data terminals, application specific gaming devices, video gaming devices, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The mobile communication device 102 can include a controller 114, at least one transceiver 116, a memory 118 and modules 120, for example function control modules 122. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below. In the embodiment depicted in FIG. 1, the function control module is generalized to control any designated function of the mobile communication device 102.

Visually suppressed mesh patterns (depicted in FIG. 3) for capacitive touch sensor buttons (depicted in FIG. 4) are touch zones that are utilized to process touch input. For example, touch input includes the touch of a user's finger or of a conductive stylus. Circuitry 124 may receive touch signals, the circuitry 124 being coupled to the controller 114 to control at least one function 122 of the electronic device 102 incorporating the touch screen device 104 according to the touch signals.

Figure 2:
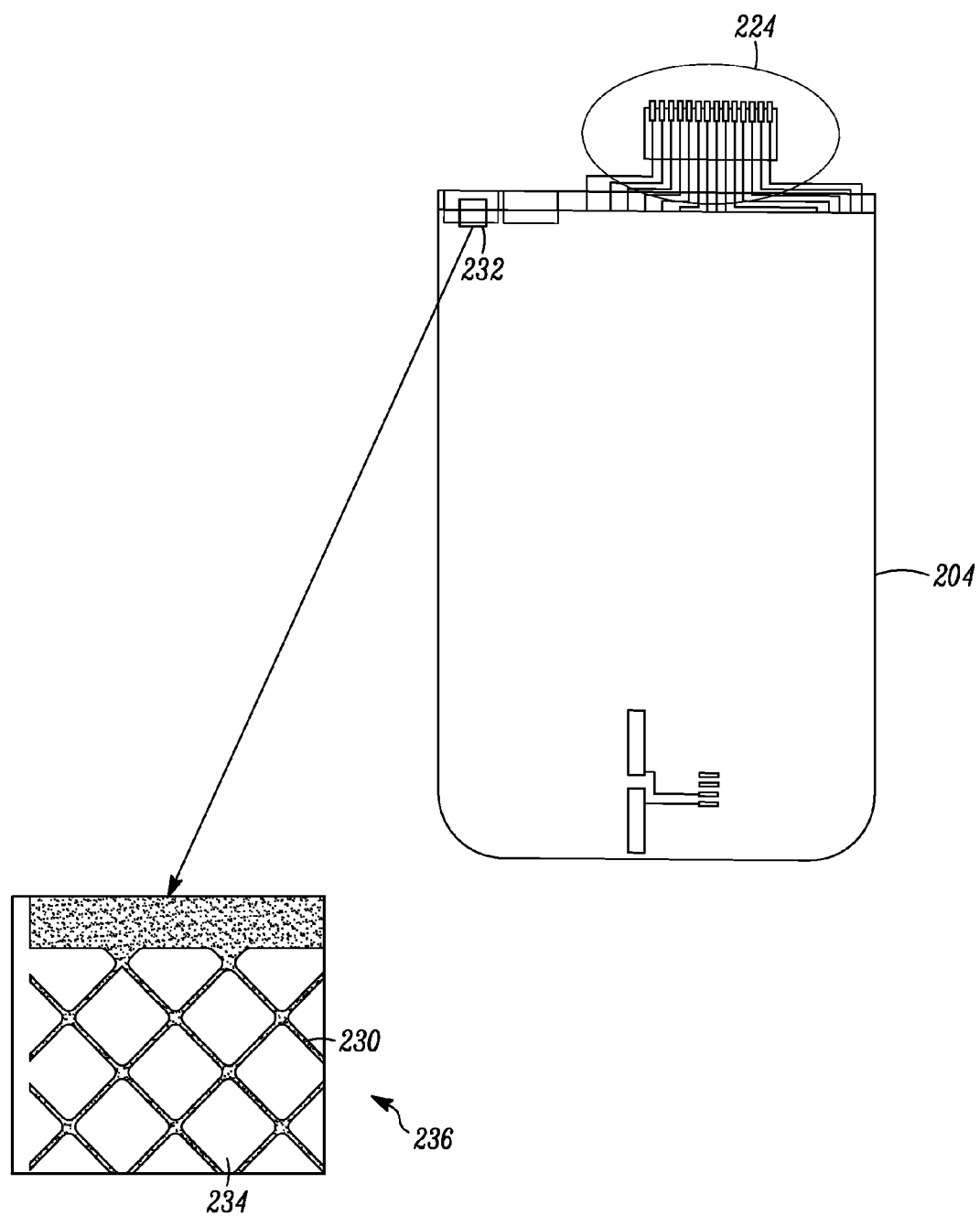
FIG. 2 depicts the disclosed mesh of a low resistive material utilized for the disclosed touch screen shown as an enlargement thereof.

FIG. 2 depicts the disclosed mesh 230 of a low resistive material utilized for the disclosed touch screen 204 shown as an enlargement 232 of thereof. The mesh 230 is shown with a bias direction of the mesh parallel to the horizontal and vertical directions. The mesh 230 may be formed, for example, through printing, masking and a blackening process.

Figure 3:
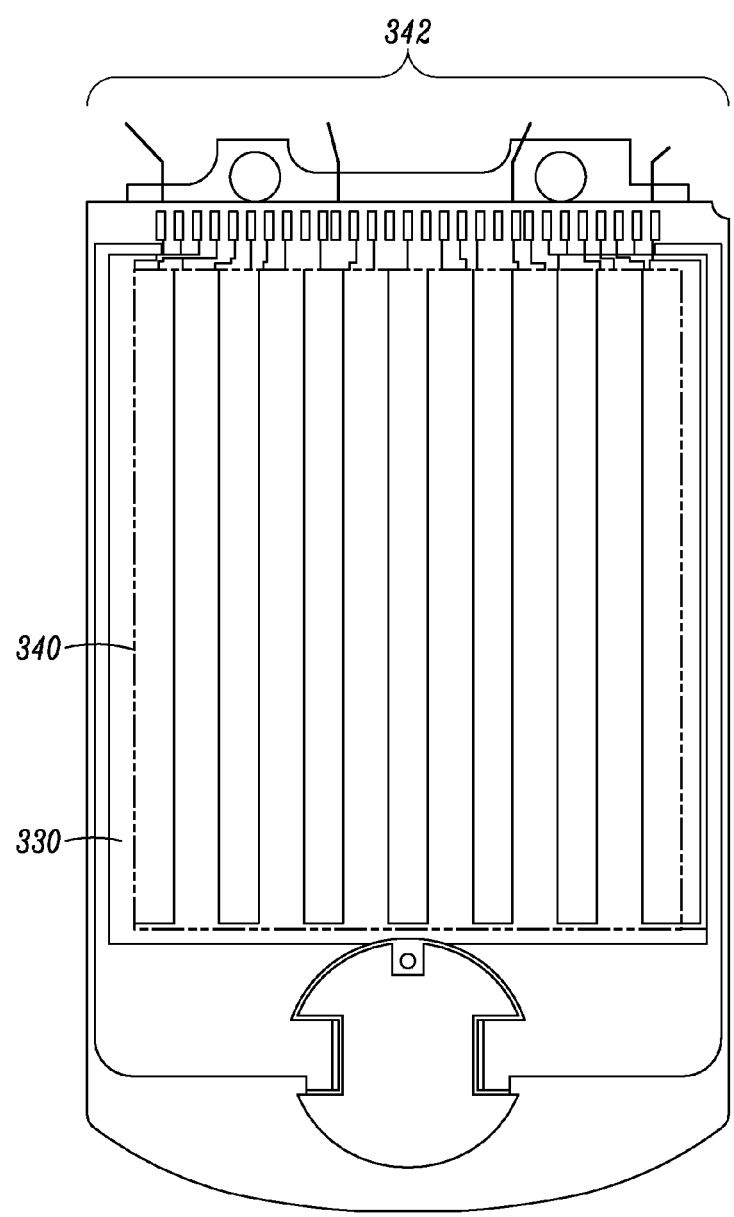
FIG. 3 illustrates pattern traces in the mesh and PCB that can be laminated to the film to connect the pattern traces to circuitry of a larger electronic device to receive touch signals.

It may be beneficial to form a mesh-film and plastic combination. Accordingly, the mesh 230 is supported by the film 234 with the flip 106 (see FIG. 1) housing and components may be attached to the combination by for example a heat process such as lamination. In the illustrated embodiment of FIG. 2, the mesh 230 has been deposited on a polyethylene terephthalate (PET) film 234 or any suitable film which was then molded with the flip housing 106 by for example a heat process to form a mesh-film and plastic combination 236. The PET film may have for example, a 0.125 mm thickness. The film 234 may be etched to isolate pattern traces when the mesh 230 is deposited on the film 234. Additionally, a heat process, such as inmold labeling technology, may be applied to form a clear clam shell form factor flip housing. (Pattern traces are depicted in FIG. 3.) Moreover, the circuitry 224 of the previously mentioned PCB may be laminated to the PET film 234 with heat sealing. Heat processes can include less processing than for example, forming a product by an adhesion process. The film 234 may beneficially support the mesh 230, and in particular when an electronic component such as a speaker is applied to the mesh 230.

As mentioned above, the mesh 230 may be of a conductive material having a low resistivity value, and in particular less than approximately 3.0 ohms per $mm^2$. Any such material that may be configurable as a mesh, such as copper, silver, gold and alloys thereof, may be utilized. Dimensions of the mesh 230 may be, for example, approximately 300 μm pitch, 10 μm width and 12.5 μm thickness. It is understood that any suitable material may be used for the mesh 230 so that it has a low resistivity value. The low resistivity value provides that the pattern traces formed in the mesh 230 may be narrower than those of pattern traces of the glass-like ITO material, the pattern traces configured to receive input to generate touch signals. Accordingly, substantially more than eight touch zones may be formed on an average sized flip of a clam shell form factor mobile communication device (see FIG. 4 for touch zones). Therefore, the functionality of the disclosed device with the flip in the closed position is improved over that of an ITO touch screen.

FIG. 3 illustrates pattern traces 340 in the mesh 330 and PCB 342 that can be laminated to the film 234 (see FIG. 2) to connect the pattern traces 340 to circuitry 342 of a larger electronic device 102 (see FIG. 1) to receive touch signals. For example, the pattern traces 340 may have a trace width to trace spacing ratio of 1:4 so that more touch zones are available on the touch screen. It is understood that any suitable trace width to trace spacing ratio to provide a desired number of touch zones is within the scope of this discussion. Moreover, the number of touch zones may be dictated by ergonomic considerations, such as the size of the object to touch the touch screen. If fingers of users are to touch the touch screen, the touch zone would be larger than were a stylus used. Also the smaller trace width to trace spacing ratio may make the touch screen material appear more translucent. In any case, a small trace width to trace spacing ratio is dependent upon the low resistivity of the mesh 330. In this way, more touch zones are possible.

When the flip of a clam shell form factor mobile communication device 102 (see FIG. 1) is closed, and indicia of the main display may be viewed through the semi-transparent touch screen of the flip incorporating the disclosed touch screen utilizing a mesh of low resistivity, the functionality of the device in the closed position is improved by the ability to include more touch zones over a device utilizing an ITO touch screen having substantially fewer touch zones.

Figure 4:
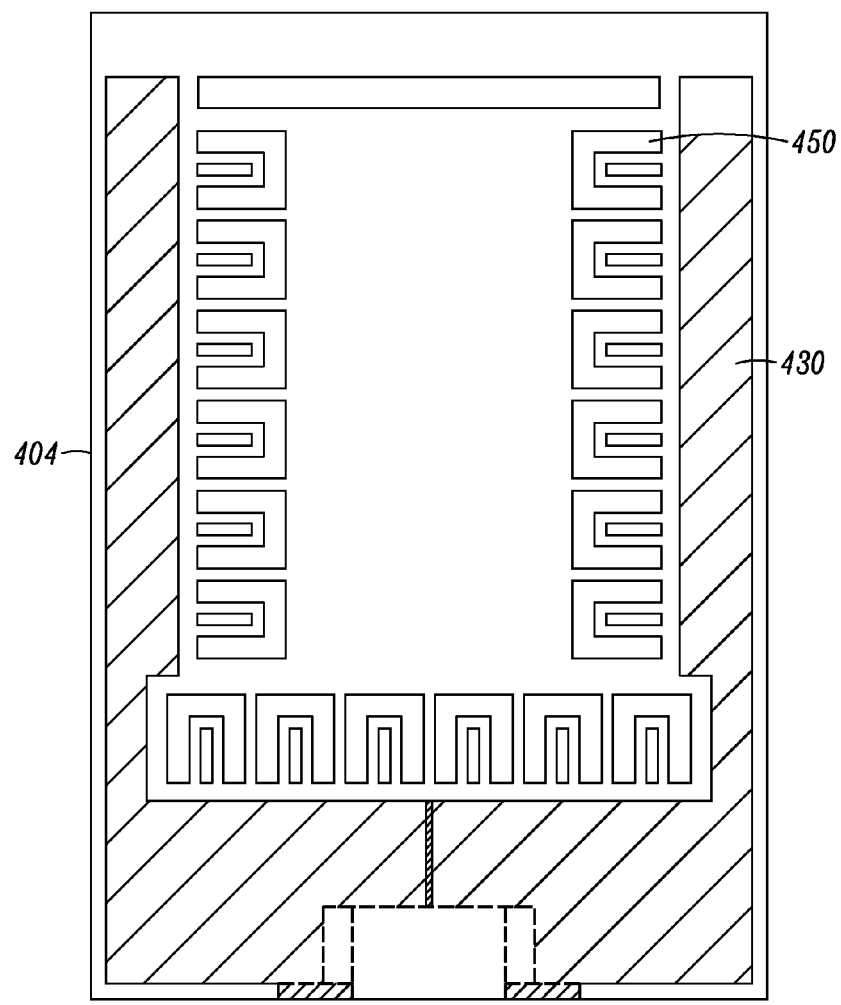
FIG. 4 depicts touch zones or buttons of the disclosed touch screen utilizing a mesh of a low resistivity material.

FIG. 4 depicts touch zones or buttons 450 of the disclosed touch screen 404 utilizing a mesh 430 of a low resistivity. In this embodiment, there are eighteen such touch zones 450. As discussed above, the disclosed semi-transparent touch screen device 404 incorporated into a mobile communication 102 (see FIG. 1) such as a clam shell form factor flip is configured so that an adjacent main display screen is visible through the touch screen device. Input received by the touch screen device is responsive to indicia displayed on the display screen. The indicia displayed on the main display screen of the main housing may be configured to correspond to the touch zones so that input received from the touch zones may provide touch signals.

The method of forming the touch zones may include forming pattern traces in a mesh of a low resistive material having a resistivity of 3.0 ohms per $mm^2$, etching in a film to isolate pattern traces when the mesh is applied to the film, and depositing by a heat process the mesh onto the film which is then molded to form a mesh-film and plastic combination. Applying electronic components to the mesh and film may be by a heat process or by adhesion. A PCB may be laminated to the film 234 (see FIG. 2) to connect the pattern traces 340 (see FIG. 3) to circuitry including the controller 114 (see FIG. 1) of a larger electronic device 102 to receive touch signals generated, for example when a finger or conductive stylus touch the touch screen 104.

The disclosed translucent touch screen device includes a mesh composed of a low resistive material and method for forming a touch screen and applying components to the touch screen according to a heat based process. The low resistivity of the mesh beneficially allows pattern traces to be of a smaller width than that of ITO, and therefore allows more touch zones per specified area than are possible in an ITO touch screen. The low resistive material, beneficially, is capable of withstanding heat processing. Heat processes can include less processing than for example, forming a product by an adhesion process.

The disclosed semi-transparent touch screen device incorporated into a mobile communication such as a clam shell form factor flip is configured so that an adjacent main display screen is visible through the touch screen device. Input received by the touch screen device is responsive to indicia displayed on the display screen. Since the disclosed touch screen incorporating a mesh having a low resistivity value may include more touch zones, beneficially the functionality of the device in the closed position is improved.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A translucent touch screen device, comprising:
a first housing positionable adjacent to a second housing, the first housing including a display screen configured to display indicia and the second housing including a touch screen, wherein the touch screen comprises:
a mesh composed of a low resistive material;
pattern traces formed in the mesh, the pattern traces configured to receive input and to generate touch signals;
virtual buttons formed on the pattern traces of a full XY touch screen, wherein the full XY touch screen includes a bias direction of the mesh parallel to horizontal and vertical directions; and
circuitry to receive touch signals, the circuitry coupled to a controller to control at least one function of an electronic device incorporating the touch screen device according to the touch signals,
wherein the indicia displayed on the display screen of the first housing is visible through the touch screen so that input received by the touch screen is responsive to the indicia displayed on the display screen of the first housing.

2. The mobile communication device of claim 1, wherein the mesh is of a conductive material having a resistivity less than approximately 3.0 ohms per $mm^2$.

3. The touch screen device of claim 1, wherein the low resistive material is copper.

4. The touch screen device of claim 1, wherein the mesh has been deposited on a film which was then molded to form a mesh-film and plastic combination.

5. The touch screen of claim 4, wherein a larger electronic device incorporating the touch screen device includes circuitry to receive touch signals, the circuitry coupled to a controller to control at least one function of an electronic device incorporating the touch screen device according to the touch signals, the device further comprising:
PCB laminated to the film to connect the pattern traces to circuitry of a larger electronic device to receive touch signals.

6. The touch screen device of claim 1, wherein the circuitry comprises at least one of resistors and capacitors to meet a requirement of the circuitry.

7. The touch screen device of claim 1, wherein the pattern traces have a trace width to trace spacing ratio of approximately 1:4.

8. The touch screen device of claim 1, further comprising discreet buttons formed on the pattern traces including more than eight discreet buttons.

9. The touch screen device of claim 1, wherein the touch screen is capacitive.

10. The touch screen device of claim 1, further comprising components molded to the touch screen by a heat process.

11. A translucent touch screen device, comprising:
a mesh composed of a low resistive material;
pattern traces formed in the mesh, the pattern traces configured to receive input and to generate touch signals;
virtual buttons are formed on the pattern traces of a full XY touch screen, wherein the full XY touch screen includes a bias direction of the mesh parallel to horizontal and vertical directions; and
circuitry to receive touch signals, the circuitry coupled to a controller to control at least one function of an electronic device incorporating the touch screen device according to the touch signals.

* * * * *